(12) United States Patent
Brock

(10) Patent No.: US 9,486,077 B2
(45) Date of Patent: Nov. 8, 2016

(54) SLIDE ASSEMBLY WITH AUTOMATIC CLOSURE

(71) Applicant: Jonathan Manufacturing Corporation, Irvine, CA (US)

(72) Inventor: Patty J. Brock, Irvine, CA (US)

(73) Assignee: Jonathan Manufacturing Corporation, Irvine, CA (US)

( * ) Notice: Subject to any disclaimer, the term of this patent is extended or adjusted under 35 U.S.C. 154(b) by 0 days.

(21) Appl. No.: 14/481,796

(22) Filed: Sep. 9, 2014

(65) Prior Publication Data

US 2015/0272325 A1    Oct. 1, 2015

Related U.S. Application Data

(60) Provisional application No. 61/876,167, filed on Sep. 10, 2013.

(51) Int. Cl.
| A47B 88/04 | (2006.01) |
| A47B 88/10 | (2006.01) |
| F16C 29/04 | (2006.01) |
| F16C 29/00 | (2006.01) |

(52) U.S. Cl.
CPC ............. *A47B 88/047* (2013.01); *A47B 88/10* (2013.01); *A47B 2210/0091* (2013.01); *F16C 29/008* (2013.01); *F16C 29/04* (2013.01)

(58) Field of Classification Search
CPC A47B 88/14; A47B 88/047; A47B 88/0481; A47B 2210/0091; A47B 88/10; F16C 29/04; F16C 29/008
USPC ............ 312/330.1, 334.1, 334.7, 334.8, 333, 312/334.11, 319.1, 334.44
See application file for complete search history.

(56) References Cited

U.S. PATENT DOCUMENTS

| 2,277,702 | A | * | 3/1942 | Kennedy | A47B 88/08 312/334.46 |
| 3,059,986 | A | * | 10/1962 | Miller | A47B 88/08 312/334.8 |
| 3,371,968 | A | * | 3/1968 | Albert | A47B 88/10 312/333 |
| 6,979,066 | B2 | * | 12/2005 | Yang | A47B 88/047 312/319.1 |
| 7,901,017 | B1 | * | 3/2011 | Kafferlin | A47B 88/047 312/219 |
| 2001/0006319 | A1 | * | 7/2001 | Dopp | A47B 88/047 312/333 |
| 2008/0211366 | A1 | * | 9/2008 | Brock | A47B 88/047 312/333 |
| 2008/0218046 | A1 | * | 9/2008 | Rechberg | A47B 88/10 312/334.11 |
| 2008/0231155 | A1 | * | 9/2008 | Shen | A47B 88/04 312/334.8 |
| 2010/0176700 | A1 | * | 7/2010 | Perez | A47B 88/047 312/334.8 |
| 2011/0175508 | A1 | * | 7/2011 | Rechberg | A47B 88/047 312/334.8 |

* cited by examiner

*Primary Examiner* — James O Hansen
(74) *Attorney, Agent, or Firm* — Knobbe, Martens, Olson & Bear LLP

(57) ABSTRACT

A slide assembly includes an outer slide segment, preferably at least one intermediate slide segment and an inner slide segment. An automatic closure arrangement applies a closing force to one or both of the inner and intermediate slide segments. In some configurations, a dampening arrangement dampens at least a portion of the travel of the slide assembly, such as the end portion of the closing travel of the slide assembly. The automatic closure arrangement can include two biasing elements, such as upper and lower constant force springs. The closure force of the constant force springs can be applied directly to the intermediate slide segment and the inner slide segment can be coupled for closing movement to the intermediate slide segment.

13 Claims, 10 Drawing Sheets

SLIDE ASSEMBLY WITH AUTOMATIC CLOSURE

RELATED APPLICATIONS

Related applications are listed in an Application Data Sheet (ADS) filed with this application. The entirety of each application listed in the ADS is hereby incorporated by reference herein.

BACKGROUND OF THE INVENTION

1. Field of the Invention

The present invention generally relates to slide assemblies with automatic closure arrangements. In particular, the present invention relates to an automatically-closing slide assembly with dampening.

2. Description of the Related Art

Some slide assemblies provide for automatic closure. Some slide assemblies provide for dampening of a portion of the slide travel, such as a portion from near to complete closure.

SUMMARY OF THE INVENTION

However, a need exists for improved automatically-closing slide assemblies. In addition, a need exists for automatically-closing slide assemblies with dampening of a portion of the closing movement. Preferably, at least some embodiments of a dampened, automatically-closing slide assembly are cost-effective to manufacture.

The systems, methods and devices described herein have innovative aspects, no single one of which is indispensable or solely responsible for their desirable attributes. Without limiting the scope of the claims, some of the advantageous features will now be summarized.

A preferred embodiment involves a self-closing slide assembly including an outer slide segment, an intermediate slide segment telescopically engaged with the outer slide segment, and an inner slide segment telescopically engaged with the intermediate slide segment. The slide assembly also includes a self-closing arrangement comprising a first biasing element and a second biasing element, wherein each of the first and second biasing elements are carried by the outer slide segment and provide a closing force tending to move one or both of the intermediate and inner slide segments toward a closed position relative to the outer slide segment.

In some configurations, at least one of the slide segments is constructed from an aluminum material and shaped into a desired cross-sectional shape by an extrusion process. In some configurations, the inner slide segment comprises a first segment member and a second segment member that is removable from the first segment member. The slide assembly can include a retention arrangement for retaining the first and second segment members in an assembled orientation and permitting selective removal of the second segment member.

In some configurations, the slide assembly includes a coupling arrangement that couples the inner slide segment and the intermediate slide segment for movement with one another during automatic closure of the slide assembly. The first and second biasing elements can be secured to the intermediate slide segment and apply the closing force directly to the intermediate slide segment.

In some configurations, the slide assembly includes bearing assemblies interposed between at least one pair of slide segments. The slide assembly can include a dampener configured to dampen at least a portion of a closing movement of the slide assembly. The slide assembly can include one or more locks to secure the segments in selected positions relative to one another. The first and second biasing elements can be an upper biasing element and a lower biasing element.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION OF THE PREFERRED EMBODIMENTS

Figure 1:
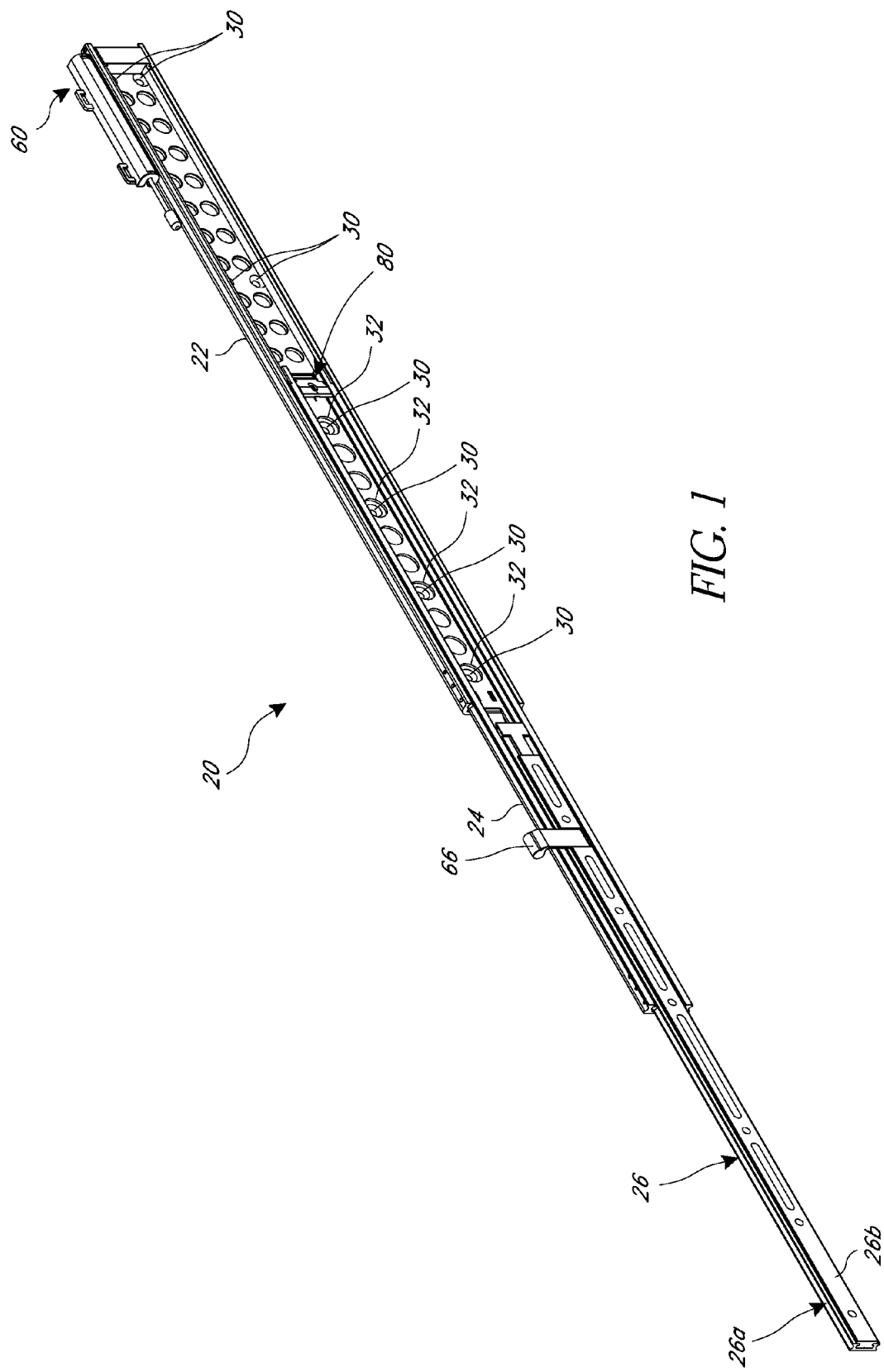
FIG. 1 is a perspective view of a slide assembly having a self-closing arrangement and dampening arrangement.
Figure 2:
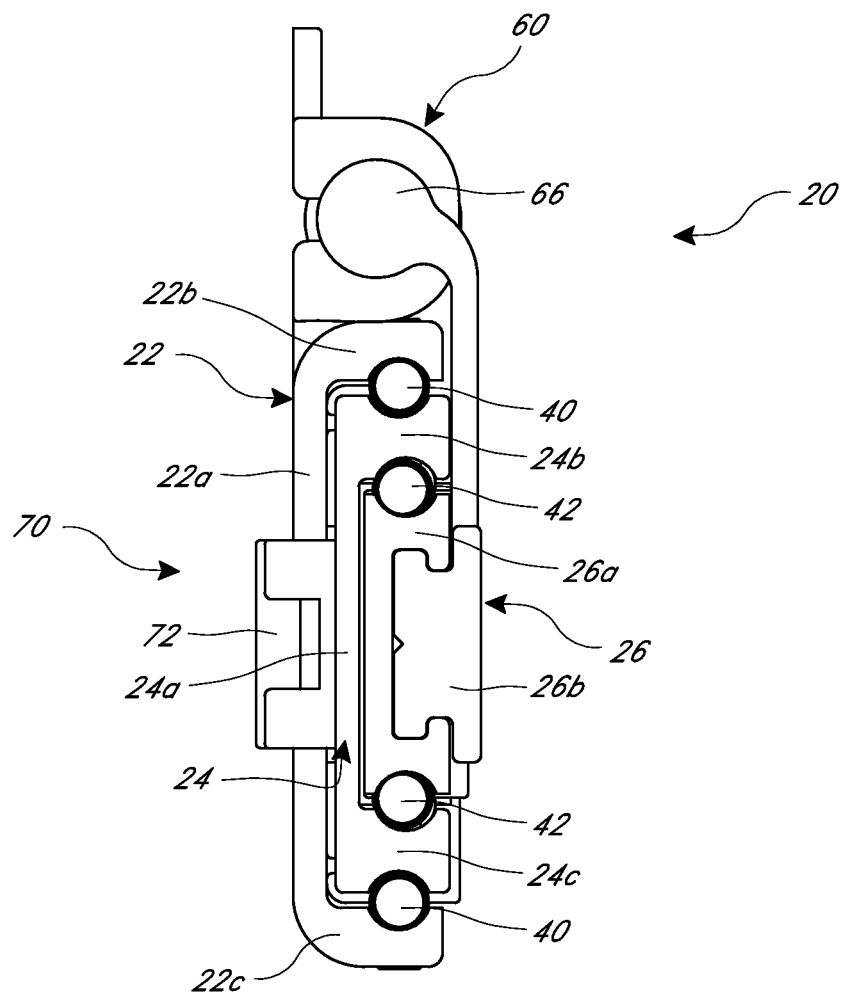
FIG. 2 is a front view of the slide assembly of FIG. 1.
Figure 3:
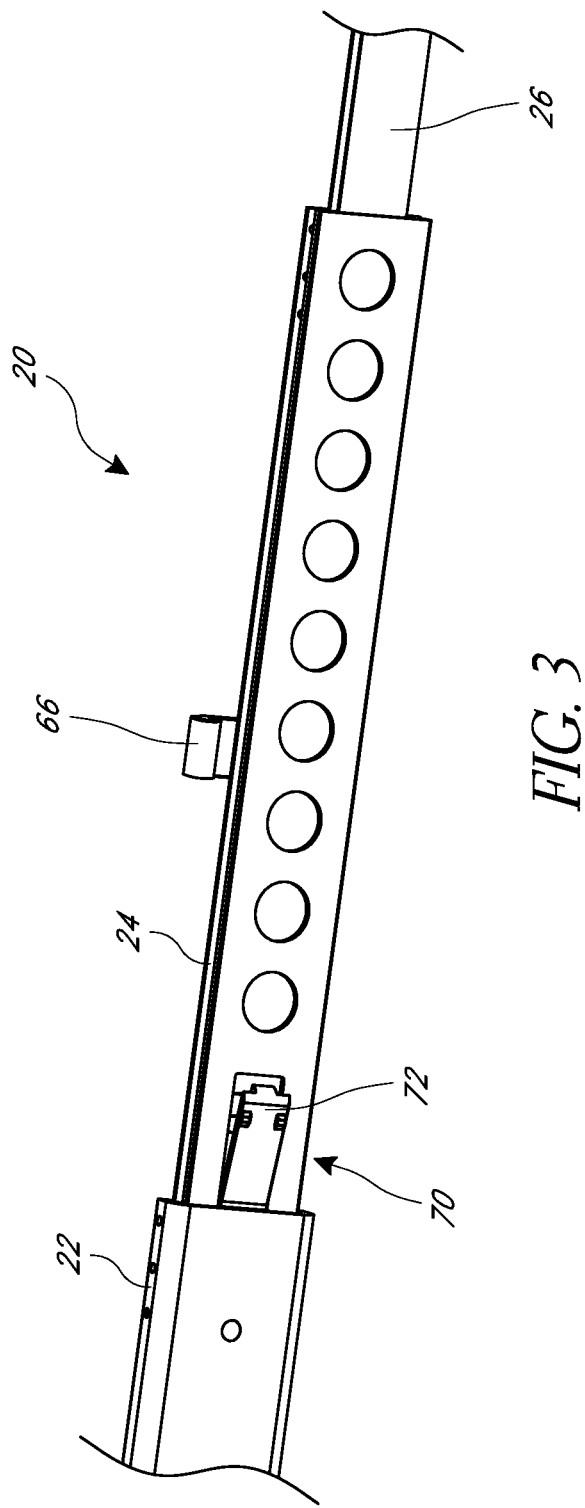
FIG. 3 is a perspective view of an outboard side of an intermediate portion of the slide assembly of FIG. 1.
Figure 4:
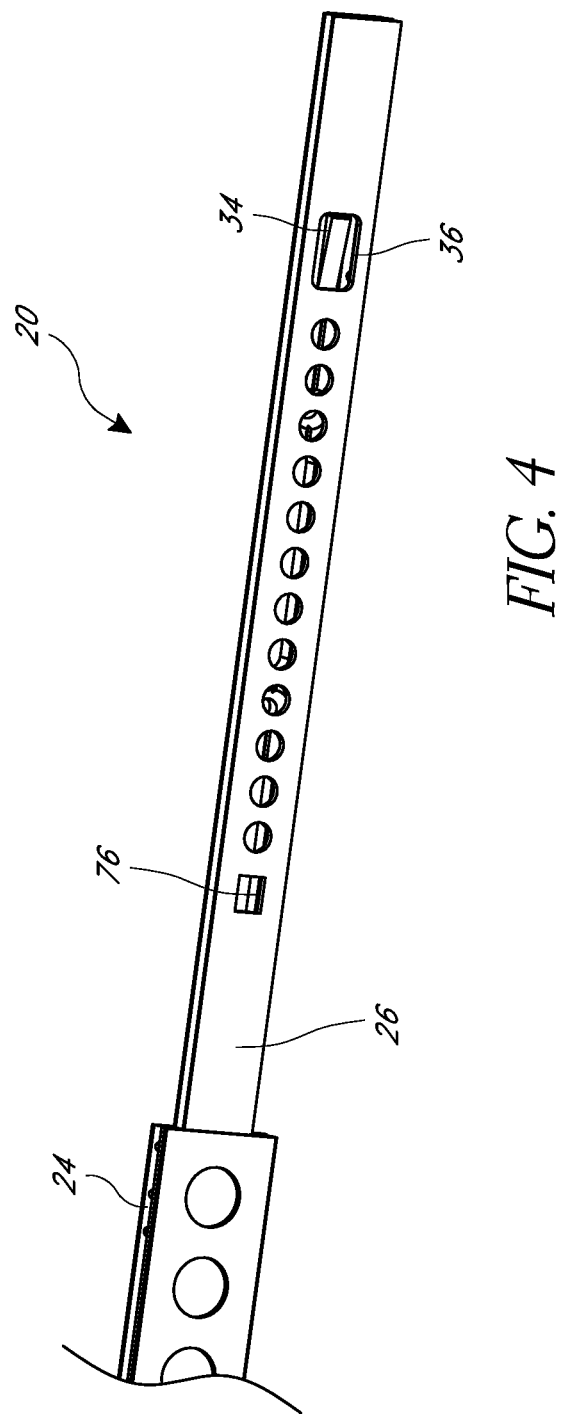
FIG. 4 is a perspective view of an outboard side of a forward portion of the slide assembly of FIG. 1.
Figure 5:
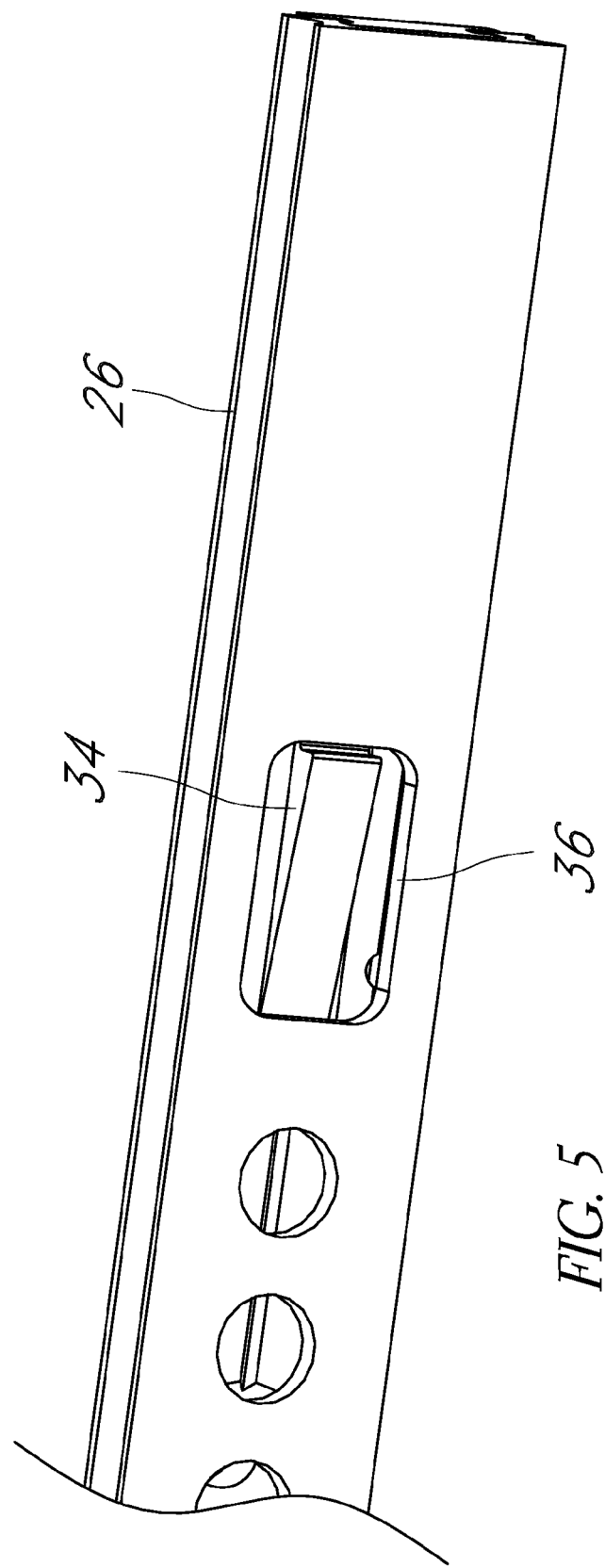
FIG. 5 is an enlarged view of the forward portion of the slide assembly of FIG. 1.
Figure 6:
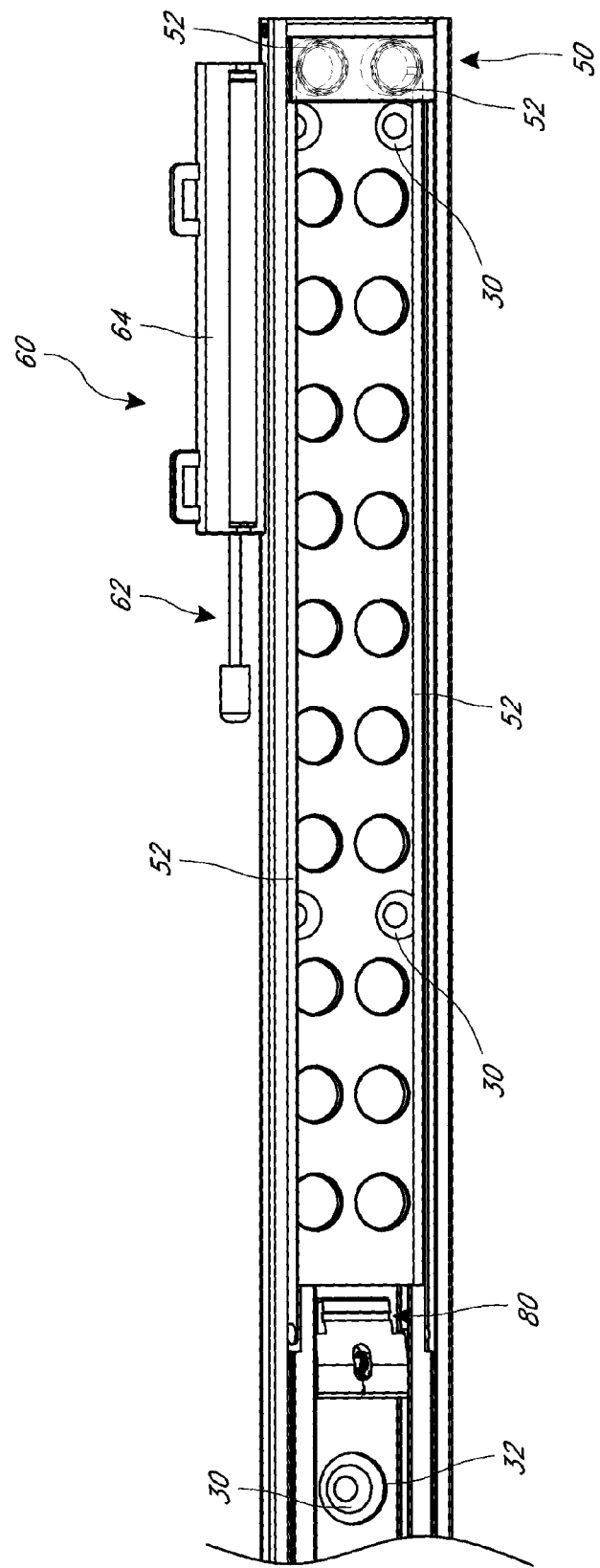
FIG. 6 is an outboard side view of a rearward portion of the slide assembly of FIG. 1.
Figure 7:
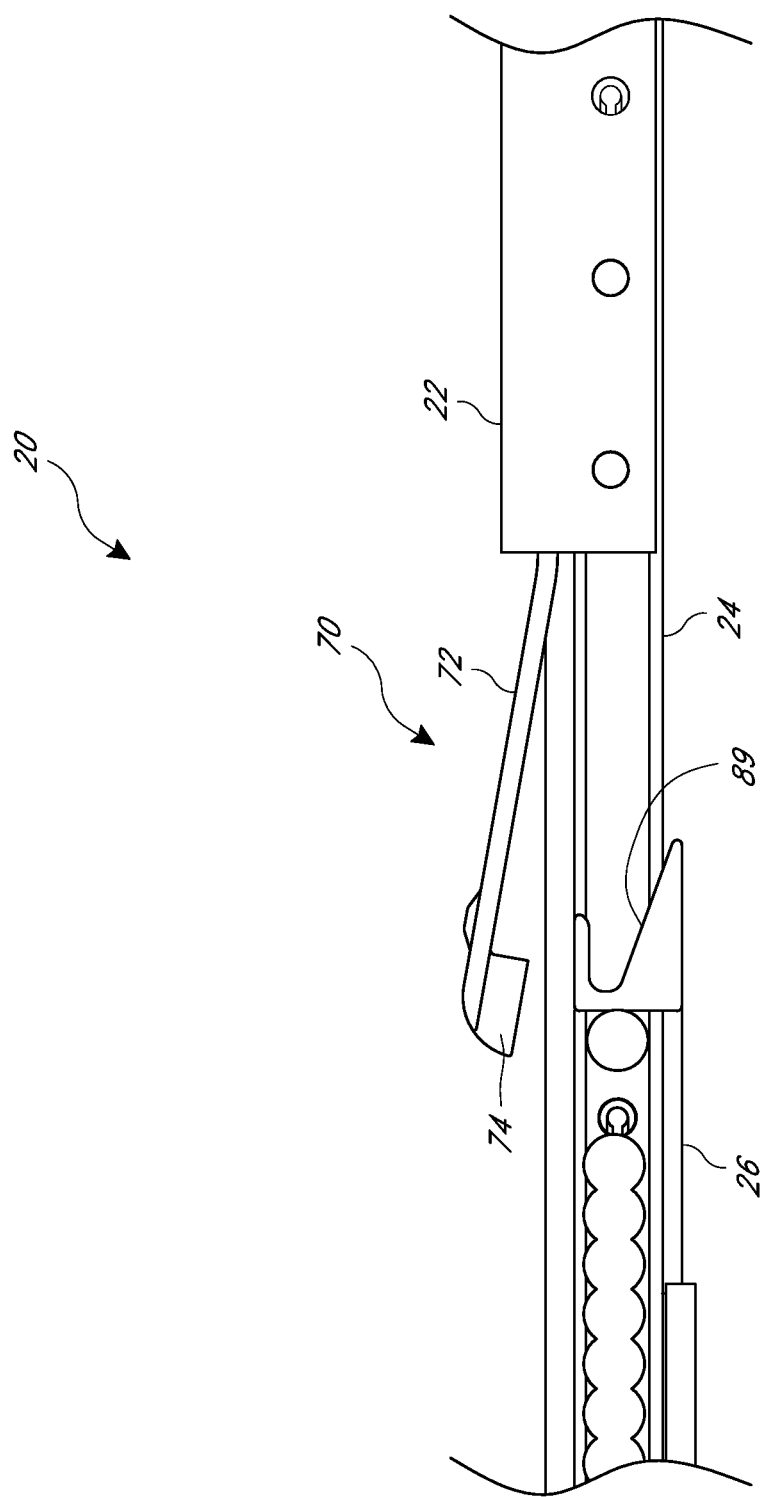
FIG. 7 is a top view of an intermediate portion of the slide assembly of FIG. 1.
Figure 8:
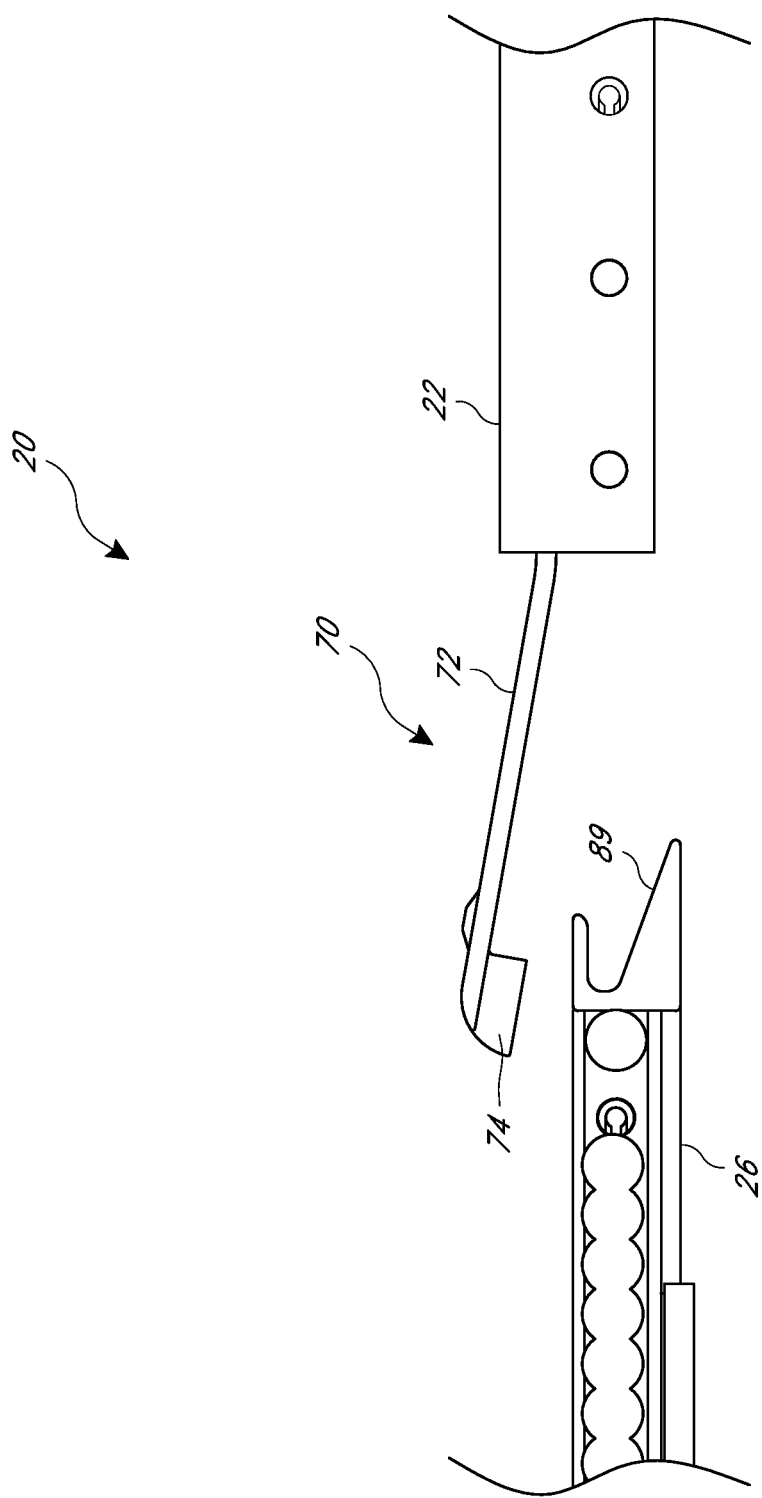
FIG. 8 is a top view of the intermediate portion of the slide assembly shown in FIG. 7 with the intermediate slide segment removed to show underlying structure.
Figure 9:
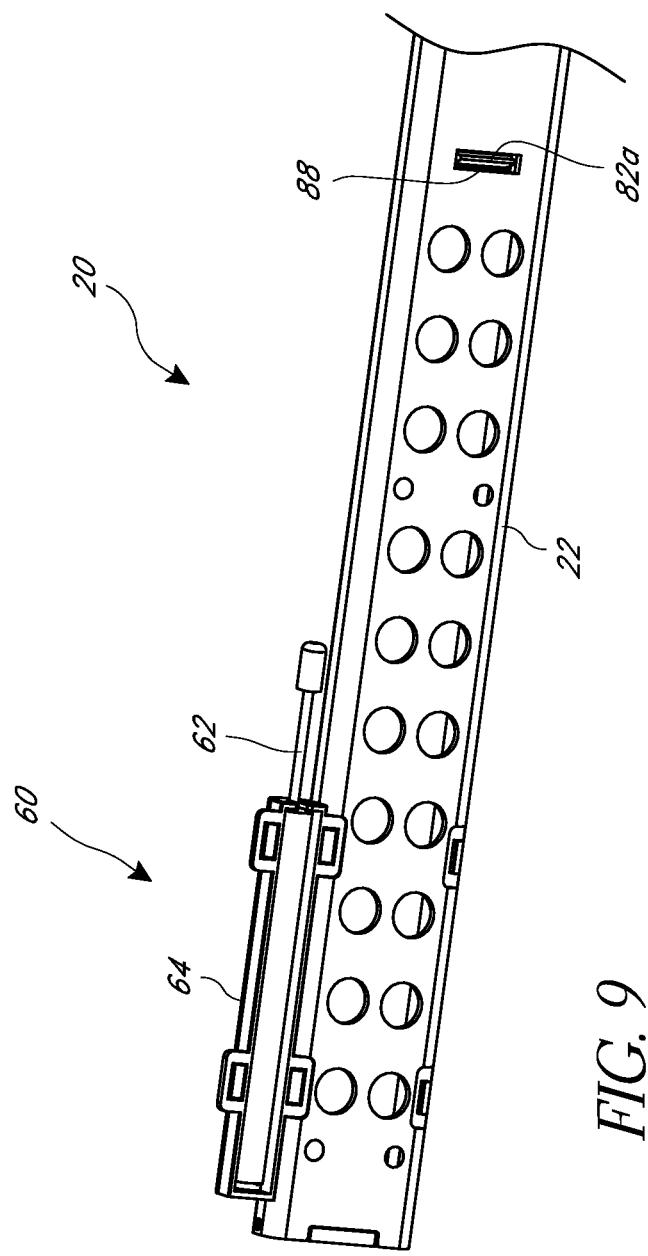
FIG. 9 is a perspective view of an outboard side of a rearward portion of the slide assembly of FIG. 1.
Figure 10:
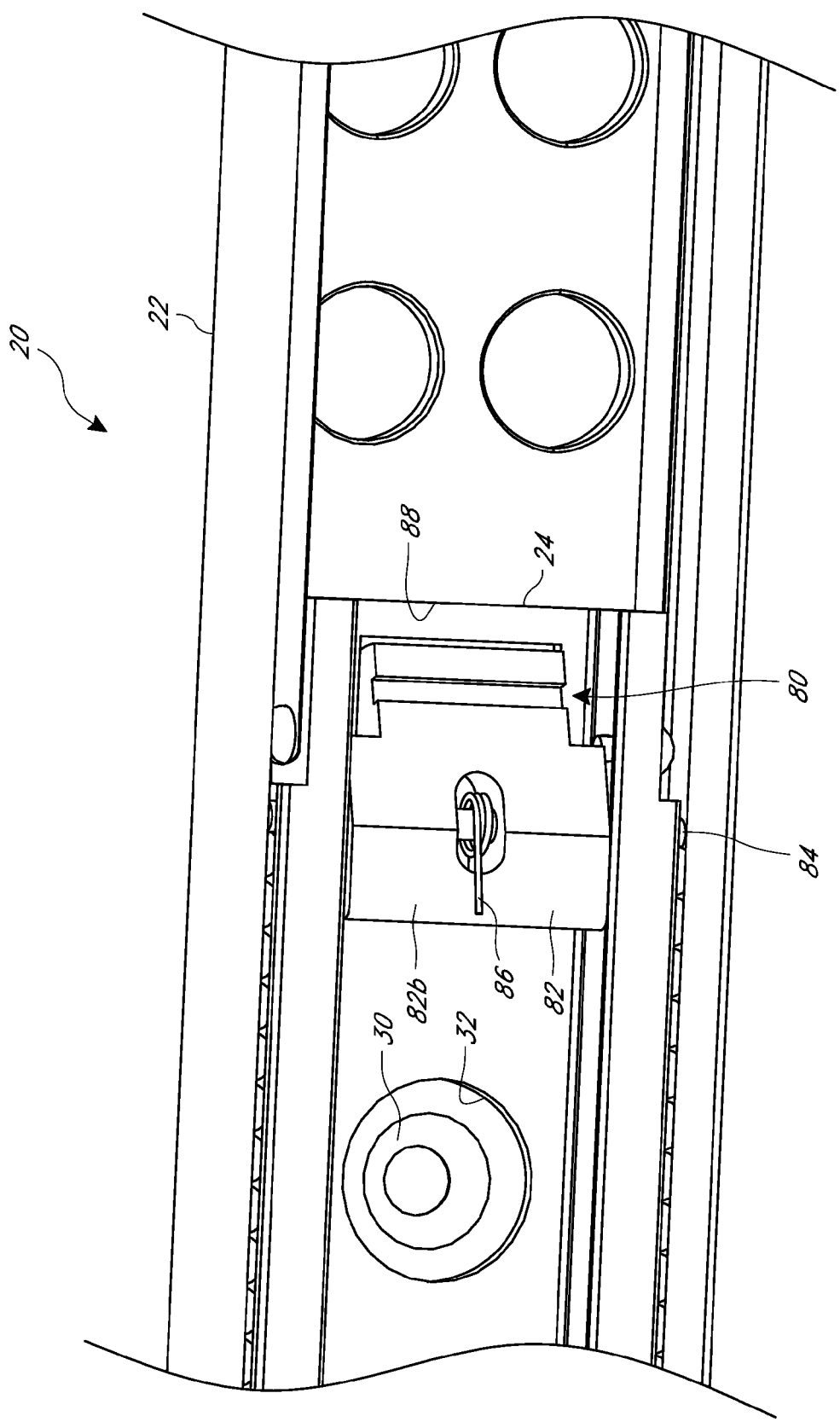
FIG. 10 is an inboard side view of an intermediate portion of the slide assembly of FIG. 1.

Preferred embodiments of the slide assemblies include between three (or possibly more) slide segments telescopically engaged with one another to move between a closed position and an open position. The slide segments may also be referred to as channels herein. However, the use of the term "channel" does not imply any particular cross-sectional shape. The segments or channels may be any suitable shape to permit telescopic engagement between the segments. Certain preferred cross-sectional shapes are illustrated and/or described herein. Typically, one or more slide assemblies permit one object to be supported and moved relative to another object. One object is often stationary, such as an enclosure or cabinet, and the other object, such as a drawer, is movable between an open and closed position relative to the stationary object. Often, a slide assembly is provided on each side of the supported object. For convenience, the slide assembly is referred to as having an outboard side and an inboard side. The outboard side typically faces outwardly from the supported object and the inboard side faces toward the supported object. Also, the slide assembly is referred to as having a forward end and a rearward end. The slide assembly opens from the forward end and moves away from the rearward end. These, and other relative terms (top, bottom, above, below, etc.) are used for convenience and with respect to the particular orientation shown in the referenced figures and are not intended to be limiting, unless otherwise indicate. Thus, the slide assemblies can also be used in other orientations, or adapted for use in orientations other than those illustrated.

The preferred embodiments disclosed herein are well-suited for use in movably supporting drawers relative to an enclosure or cabinet. For example, and without limitation, the illustrated slide assembly is well-suited for use in commercial, business or other airplane applications, or other similar applications. In addition, the slide assemblies are capable of supporting the loads expected by the intended application, and often additional loading, while still maintaining smooth extension and retraction of the slide assembly.

The figures illustrate a slide assembly 20 having certain features, aspects and advantages of the preferred embodiments. In the illustrated arrangement, the slide assembly 20 includes three slide segments: an outer slide segment 22, an intermediate slide segment 24 and an inner slide segment 26 telescopically engaged with one another and movable between a closed position and an open position. However, in other arrangements, the slide assembly 20 may include only two segments, or more than three segments. As described in greater detail hereinafter, the slide assembly 20 can include one or more locking mechanisms that permit the slide assembly 20 to be selectively locked in one or more of a closed position, an open position, and a partially open or closed position, among others. In addition, the slide assembly 20 preferably includes bearings (ball bearings, rollers or other suitable arrangements) interposed between the slide segments 22, 24, 26 to facilitate smooth relative movement therebetween. However, in other arrangements, the segments 22, 24, 26 can slide directly on one another without any bearing arrangement.

The slide segments 22, 24, 26 can be constructed from any suitable material by any suitable process. For example, one or more of the slide segments 22, 24, 26 can be extruded (or similarly-formed) from a metal material (e.g., aluminum). In addition or in the alternative, one or more of the slide segments 22, 24, 26 can be formed from a sheet of metal material and bent into a final cross-sectional shape. For example, a flat sheet of steel can be bent by a roll forming process to create a slide segment 22, 24, 26 having a desired cross-sectional shape.

Preferably, the outer slide segment 22 includes a vertical wall portion or web 22a, an upper or first portion or flange 22b and a lower or second portion or flange 22c. The flanges 22b, 22c extend in the same direction from opposing (upper and lower) edges of the web 22a and each define recessed bearing surfaces on the inner surfaces that face one another. The illustrated outer slide segment 22 is an extruded aluminum component. The web 22a of the outer slide segment 22 includes a plurality of mount openings 30 that facilitate mounting of the slide assembly 20 to an enclosure, cabinet or other object. The intermediate slide segment 24 can include openings 32 that correspond (e.g., overlap) with one or more of the mount openings 30 in one or more relative positions therebetween (e.g., fully open). In the illustrated arrangement, the rearward mount openings 30 are behind the intermediate slide segment 24 when it is in the opened position. The rearward mount openings 30 can include axially-aligned upper and lower mount openings 30. The forward mount openings 30, such as those overlapped by the intermediate slide segment 24, can be located at or near the vertical center of the web 22a.

The illustrated intermediate slide segment 24 is formed with a cross-sectional shape similar to that described above with respect to the outer slide segment 22. Thus, the intermediate slide segment 24 includes a vertical wall portion or web 24a, an upper or first portion or flange 24b and a lower or second portion or flange 24c. The flanges 24b, 24c extend in the same direction from opposing (upper and lower) edges of the web 24a and each define recessed bearing surfaces on the inner surfaces that face one another and the outer surfaces that face away from one another. The illustrated intermediate slide segment 24 is an extruded aluminum component.

The inner slide segment 26 has upper and lower outward-facing surfaces preferably including recessed bearing surfaces. The inner slide segment 26 can be a multi-piece component, such as a two-piece component, for example. The illustrated inner slide segment 26 has a first member 26a that defines the bearing surfaces and a second member 26b that is slidably-received within the first member 26a. Preferably, the first member 26a is an extruded aluminum member having a web and upper and lower flanges. The first member 26a can have return portions at the outer or free ends of the flanges to define a C-shaped cross-sectional profile. A portion of the second member 26b can be received and laterally retained within the inner space defined by the C-shaped first member 26a. The second member 26b can be a bent member, such as a bent piece of steel sheet metal, or can be an extruded member, such as extruded aluminum. The second member 26b preferably is generally H-shaped in cross-section, with one side of the H-shaped second member 26b received within the inner space of the C-shaped first member 26a and the center of the H-shaped second member 26b passing between the return portions of the C-shaped first member 26a. The side of the H-shaped second member 26b received by the first member 26a can have a smaller height than the side of the H-shaped second member 26b positioned adjacent to the first member 26a.

The supported object can be secured to the second member 26b and, thus, can be easily and quickly removed from the remainder of the slide assembly 20 by removing the second member 26b (and object) from the first member 26a. A lock arrangement or latch 34 can be carried by one of the first and second members 26a, 26b to engage an engagement or stop surface of the other of the first and second members 26a, 26b. In the illustrated arrangement, the latch 34 is carried by the second member 26b and engages a stop surface defined by an opening 36 of the first member 26a to inhibit unintentional or undesired removal of the second member 26b from the first member 26a. The latch 34 can be actuated (e.g., pressed inwardly) to disengage the latch 34 from the stop surface of the opening 36 and permit removal of the second member 26b. The first member 26a can include a stop (such as at a rearward end thereof) to define a fully inserted position of the second member 26b.

Preferably, the intermediate slide segment 24 is supported for movement relative to the outer slide segment 22 by a plurality of bearings and, in particular, ball bearings 40. Preferably, the inner slide segment 26 is supported for movement relative to the intermediate slide segment 24 by a plurality of bearings and, in particular, ball bearings 42. Although not shown, if desired, the ball bearings 40, 42 can be held by a single carrier that carries the upper and lower ball bearings 40, 42 in a spaced-apart arrangement from one another or separate bearing carriers that respectively carry the upper and lower bearings could also be used. Forward and rearward bearing stops can be secured to or integrated with the segments 22, 24, 26, such as integrated tabs punched from the body of the segment 22, 24 or 26 and positioned or deformed into the path of the ball bearings 40, 42. Although loose ball bearings 40, 42 are illustrated, other suitable mechanisms may be used to allow smooth movement between the individual segments 22, 24, 26, including solid bearing surfaces.

Preferably, the slide assembly 20 includes a self-closing arrangement or automatic closure arrangement 50 that moves one or both of the slide segments 24 or 26 in a closing direction of the slide assembly 20 or in a closing direction relative to the outer slide segment 22. Preferably, the automatic closure arrangement 50 provides a closure force tending to move the intermediate slide segment 24 toward a closed position relative to the outer slide segment 22. As described below, preferably, the inner slide segment 26 is coupled for movement with the intermediate slide segment 24 during at least a portion of the slide travel or under certain conditions (e.g., when the inner slide segment 26 is retracted relative to the intermediate slide segment 24 and when the intermediate slide segment 24 is at least initially retracted into the outer slide segment 22) such that the closing force applied to the intermediate slide segment 24 is also transferred and causes closure of the inner slide segment 26.

Preferably, the automatic closure arrangement 50 includes at least one biasing element that provides the closure force. In the illustrated arrangement, the automatic closure arrangement 50 includes a pair of biasing elements, such as roll springs or constant force springs 52 (a rolled ribbon of spring steel), that provides the closure force. Preferably, an upper and lower constant force spring 52 are coupled to respective upper and lower locations on a rearward end of the outer slide segment 22 to provide preferably equal or even closure forces to upper and lower locations of the rearward end of the intermediate 24 slide segment. With such an arrangement, the diameter, length or axial dimension of the springs 52 can be reduced relative to a single spring that provides an equal force. In the illustrated arrangement, the springs 52 are coupled to a support body or housing, which is secured to a rearward end of the outer slide segment 22 between the upper and lower flanges 22b, 22c. Advantageously, such an arrangement is compact and preserves room for other component of the slide assembly 20. Free ends of the springs 52 can be secured to upper and lower flanges 24b, 24c (or other suitable locations) of the intermediate slide segment 24 by any suitable arrangement, such as mechanical fasteners (e.g., rivets or screws).

The slide assembly 20 preferably also includes a dampening arrangement 60 that dampens at least a portion of the travel of the slide assembly 20. In the illustrated arrangement, the dampening arrangement dampens a final portion of the closure of the slide assembly 20, such as the final inch to few inches of closure, for example, to inhibit forceful closure. The dampening arrangement 60 includes a dampener 62, which can be of any suitable arrangement, such as a gas or fluid dampener, for example and without limitation. The dampener 62 includes a cylinder and a rod. Preferably, the cylinder is secured to the outer slide segment 22 and the rod is able to move relative to the cylinder and the outer slide segment 22. In the illustrated arrangement, the cylinder is secured to and/or within a housing 64, which is mounted to a rearward end of the outer slide segment 22. The rod extends in a forward direction from the cylinder. In addition, preferably, the housing 64 includes one or more portions, such as similar to the upper tabs, that are received within one or more recesses or cavities that inhibits or prevents axial movement of the engagement portion 66; however, lateral removal of the housing 64 is not prevented. When the slide assembly 20 is coupled to a stationary object, such as a cabinet, the object prevents lateral movement of the housing 64 and secures the dampening arrangement 60 to the outer slide segment 22. The upper tabs can be utilized to additionally secure the dampening arrangement 60 relative to the slide assembly 20. For example, the upper tabs can be utilized to allow the dampening arrangement 60 to be directly coupled to the cabinet.

The inner slide segment 26 carries a bumper or engagement portion 66 that contacts or engages the rod of the dampener 62 to apply the dampening force to the inner slide segment 26 (and, in the illustrated arrangement, also to the intermediate slide segment 24 due to the interlocking of the two segments 24, 26 at the relevant portion of the slide travel). In the illustrated arrangement, the engagement portion 66 is carried by the second member 26b of the inner slide segment 26. In alternative arrangements, the engagement portion 66 could be carried by the intermediate slide segment 24; however, the inner slide segment 26 provides an advantageous mounting location because of the fairly large exposed vertical surface. In addition, preferably, the engagement portion 66 is received within a recess or cavity that inhibits or prevents axial movement of the engagement portion 66; however, lateral removal of the engagement portion 66 is not prevented. When the slide assembly 20 is coupled to a movable object, such as a drawer, the object prevents lateral movement of the engagement portion 66 and secures the engagement portion 66 to the inner slide segment 26. Also, other suitable types of dampening arrangements could also be used, which may include other methods or arrangements for transferring the dampening force to the inner or intermediate slide segments, such as a gear-type dampener that engages gear teeth of the inner or intermediate slide segments, for example.

The slide assembly 20 may include multiple locks, which operate to secure segments in desirable positions relative to one another and release the segments at a desirable time during cycling of the slide assembly 20. As described above, a first lock arrangement 70 can couple the inner slide segment 26 for movement with the intermediate slide segment 24, such as during the initial opening of the slide assembly 20 from the closed position and can then decouple the inner slide segment 26 from the intermediate slide segment 24 to allow the inner slide segment 26 to continue moving toward an open position independently of the intermediate slide segment 24. As discussed above, the first lock arrangement 70 preferably also secures the inner slide segment 26 for movement with the intermediate slide segment 24 during closure of the intermediate slide segment 24 caused by, for example, the automatic closure arrangement 50. The first lock arrangement 70 include a latch or lock arm 72 coupled to the intermediate slide segment 24 and that includes an engagement portion or tab 74 that engages an engagement surface carried by or defined by the inner slide segment 26. In the illustrated arrangement, the engagement surface is defined by a recess or opening 76 in the inner slide segment 26. The opening 76 is located on the inner slide segment 26 such that the tab 74 engages the opening 76 when the inner slide segment 26 is substantially or fully closed relative to the intermediate slide segment 24. In addition, the lock arm 72 is located on the intermediate slide segment 24 such that at least the portion of the lock arm 72 containing the tab 74 is located forward of the outer slide segment 22 such that the lock arm 72 can project away from the inner slide segment 26 and out of engagement therewith due to a normal biasing force of the lock arm 72, which can be created by resiliency of the lock arm or by a biasing device, such as a spring. When the intermediate slide segment 24 is retracted into the outer slide segment 22 (and the inner slide segment 26 is closed relative to the intermediate slide segment 24), the outer slide segment 22 moves the lock arm 72 into an engagement position in which the tab 74 engages the opening 76. Thus, with such an arrangement, the inner slide segment 26 is coupled for movement with the intermediate slide segment 24 such that an automatic closing force applied directly to the intermediate slide segment 24 is transferred to the inner slide segment 26. Advantageously, the structure can be relatively simple, reliable and cost-effective to manufacture.

The slide assembly 20 also includes a second lock arrangement 80 that operates to secure the intermediate segment 24 in an open position relative to the outer segment 22, at least until released manually or, for example, by the inner slide segment 26 during closing of the slide assembly 20. Preferably, the second lock 80 includes a latch 82 that is rotatably supported by a pin 84. The latch 82 is biased in a first direction by a biasing member, such as a spring 86. A portion (e.g., hook or tab 82a) of the latch 82 engages an opening 88 in the outer slide segment 22 when the intermediate slide segment 24 is in an open position relative to the outer slide segment 22. The latch 82 also defines a surface (e.g., release surface 82b) that engages a cam surface 89 of the inner slide segment 26. The cam surface 89 causes the latch 82 to rotate during closing motion of the inner slide segment 26 (when sufficiently closed relative to the intermediate slide segment 24) such that the hook 82a is withdrawn from the opening 88 to release the intermediate slide segment 24 from the outer slide segment 22. The intermediate slide segment 24 is then able to close relative to the outer slide segment 22. Rearward travel of the intermediate slide segment 24 within the outer slide segment 22 can be limited by a stop of the outer slide segment 22.

The slide assembly 20 could also employ other locks to accomplish other functions. For example, a third lock arrangement could be operable to selectively secure the inner slide segment 26 in an intermediate position, between an open position and a closed position, relative to the intermediate slide segment 24. The slide assembly 20 could also include a fourth lock arrangement or a "lock closed" arrangement. The fourth lock could be configured to selectively secure the slide assembly 20 in a closed position, in which the intermediate slide segment 24 is retracted relative to the outer slide segment 22, and the inner slide segment 26 is retracted relative to the intermediate slide segment 24. Preferably, the third and fourth locks are of any suitable construction, such as similar to, substantially the same as or identical to the other locks described herein from a structural and functional standpoint. Accordingly, a detailed discussion of the structure and operation of the third lock and fourth locks is omitted.

Although multiple lock arrangements are discussed herein and referred to as first, second, third and fourth locks, it is not required nor implied that all four lock arrangements are necessarily present in any particular embodiment. Rather, some or all of the lock arrangements may be used depending on the particular application and the desired operational sequence of the slide assembly. Moreover, additional lock arrangements may also be provided.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. Corresponding features can be interchanged between the embodiments. It is therefore intended that such changes and modifications be included within the scope of the invention. Moreover, not all of the features, aspects and advantages are necessarily required to practice the present invention. Accordingly, the scope of the present invention is intended to be defined only by the claims.

What is claimed is:

1. A self-closing slide assembly, comprising:
    an outer slide segment;
    an intermediate slide segment telescopically engaged with the outer slide segment, wherein the intermediate slide segment is configured to extend from and retract within the outer slide segment;
    an inner slide segment telescopically engaged with the intermediate slide segment, wherein the inner slide segment is configured to extend from and retract within the intermediate slide segment;
    a self-closing arrangement comprising a first biasing element and a second biasing element, wherein each of the first and second biasing elements are carried by the outer slide segment and fastened to the intermediate slide segment to apply a closing force directly to the intermediate slide segment to move the intermediate slide segment toward a closed position relative to the outer slide segment.

2. The slide assembly of claim 1, wherein at least one of the slide segments is constructed from an aluminum material and shaped into a desired cross-sectional shape by an extrusion process.

3. The slide assembly of claim 1, wherein the inner slide segment comprises a first segment member and a second segment member that is removable from the first segment member.

4. The slide assembly of claim 3, further comprising a retention arrangement for retaining the first and second segment members in an assembled orientation and permitting selective removal of the second segment member.

5. The slide assembly of claim 1, further comprising a coupling arrangement that couples the inner slide segment and the intermediate slide segment for movement with one another during automatic closure of the slide assembly.

6. The slide assembly of claim 1, further comprising bearing assemblies interposed between at least one pair of slide segments.

7. The slide assembly of claim 1, further comprising a dampener configured to dampen at least a portion of a closing movement of the slide assembly.

8. The slide assembly of claim 1, further comprising one or more locks to secure the segments in selected positions relative to one another.

9. The slide assembly of claim 1, wherein the first and second biasing elements comprise an upper biasing element and a lower biasing element.

10. The slide assembly of claim 9, wherein the upper biasing element and the lower biasing element are fastened to upper and lower flanges of the intermediate slide segment.

11. The slide assembly of claim 10, wherein the upper biasing element and the lower biasing element comprise constant force roll springs.

12. The slide assembly of claim 1, wherein the inner slide segment is continuously engaged with the intermediate slide segment during operation of the slide assembly.

13. The slide assembly of claim 1, wherein the intermediate slide segment is configured to transfer a load from the inner slide segment to the outer slide segment when the inner slide segment is extended from the intermediate slide segment and the intermediate slide segment is extended from the outer slide segment.

* * * * *